United States Patent [19]
Hoagland et al.

[11] Patent Number: 6,117,338
[45] Date of Patent: Sep. 12, 2000

[54] CONTINUOUS POLYMER MELT FILTRATION

[75] Inventors: John C. Hoagland, Longmeadow; David P. Bourcier, Ludlow, both of Mass.

[73] Assignee: Solutia, Inc., St. Louis, Mo.

[21] Appl. No.: 09/275,963

[22] Filed: Mar. 25, 1999

[51] Int. Cl.[7] .......................... B01D 37/00; B01D 35/02; B01D 35/30

[52] U.S. Cl. .................. 210/767; 210/774; 210/323.2; 210/340; 210/420; 210/424; 425/199

[58] Field of Search .................. 210/767, 774, 210/323.1, 323.2, 330, 340, 341, 418, 420, 423, 424; 425/197, 198, 199

[56] References Cited

U.S. PATENT DOCUMENTS

| | | | |
|---|---|---|---|
| 3,618,781 | 11/1971 | Brown | 210/341 |
| 3,669,166 | 6/1972 | Colin | 146/174 |
| 3,896,029 | 7/1975 | Beuselinck | 210/341 |
| 3,940,222 | 2/1976 | Zink | 425/199 |
| 4,202,659 | 5/1980 | Kinoshita | 425/183 |
| 4,277,338 | 7/1981 | Hoagland | 210/186 |
| 4,280,907 | 7/1981 | Häberle | 210/408 |
| 4,511,472 | 4/1985 | Trott | 210/340 |
| 4,654,151 | 3/1987 | Kalman | 210/774 |
| 4,755,290 | 7/1988 | Neuman et al. | 210/138 |
| 5,151,025 | 9/1992 | Müller | 425/199 |
| 5,451,106 | 9/1995 | Nguyen et al. | 366/176.2 |
| 5,462,653 | 10/1995 | Hills | 210/85 |
| 5,474,722 | 12/1995 | Woodhams | 264/45.3 |

*Primary Examiner*—Robert J. Popovics
*Attorney, Agent, or Firm*—Fitzpatrick, Cella, Harper & Scinto

[57] ABSTRACT

Apparatus for continuously filtering molten polymer comprising: an arbor seated in a fixed support, the arbor having inlet and outlet ports for respectively receiving contaminated and discharging filtered melt, the ports communicating with openings in a pair of housings rotatably mounted on the arbor; a plurality of filter pod assemblies outwardly of and mounted on the rotatable housings, each assembly having a filter for contaminated melt and intake and discharge openings intermittently alignable with the ports on rotation of the housings to position a clean filter in the path of the contaminated melt and to remove the filter from the path when blocked with contaminants; passages associated with the inlet and outlet ports of the arbor and the housings for gradually establishing a flow of melt into a clean filter as it is rotated into filtering position; and thermally dilatable seal between the rotatable housings and the arbor to seal the housings and the arbor during the filtering of contaminated melt by a filter element of a filter pod assembly and to establish a clearance between the housings and arbor as a result of thermal expansion of the thermally dilatable seal to allow rotary movement of each housing to replace a blocked filter with a clean filter. A continuous filter process is provided by operation of the above apparatus.

12 Claims, 5 Drawing Sheets

CONTINUOUS POLYMER MELT FILTRATION

BACKGROUND OF THE INVENTION

1. Field of the Invention

The present invention generally relates to filtration of thermoplastic polymer melt and more particularly to continuous filtering of molten polymer melt which allows for changing of filters without interrupting polymer flow.

2. Related Background Art

It is common to filter melted plastic in a high pressure line leading to an extrusion die to insure high quality of the extruded products and avoid plugging openings due to the presence of contaminants in the melt.

Melted plastic presents unique problems for standard fluid filtering techniques by virtue of its substantial viscosity, the high temperatures at which the plastic must be maintained to insure satisfactory flow yet without high temperature degradation, the extremely high pressures to which the plastic is subjected to cause the flow, and the need for homogenous flow that not only is devoid of contaminants but of air and other gases as well.

Thermoplastic polymer is very often formed into a finished or semi-finished state by an extrusion process in which the polymer and optional other ingredients are mixed in melt form and forced through an opening of suitable dimension in a die into a mold or into the air as a sheet or strand. When it is required that the polymer be of high quality it is usually necessary to filter the extruding melt to remove unwanted matter, such as gel particles, incompletely dispersed additives compounded therewith and burnt stock from local overheating and degradation of the polymer. Gel particles are regions of higher than average viscosity due to excess molecular weight or cross-linking of polymer molecules. The presence of contaminants is less with prime virgin plastic but increased when plastic trim, rejects and start-up/shut-down scrap is included in the polymer melt stream.

Prior art filters commonly comprise filter screens interposed in the path of the melt. Such apertures are selected based on the size of contaminant being removed from the melt flow. The screen blocks contaminant material from passage through the screen openings and allows contaminant-free melt to pass freely to the outlet.

Features desired in a molten polymer filter system include: continuous filtration without interruption of melt flow as a blocked filter element is replaced with a clean one; and minimum "dead spot" areas for polymer to cease flowing locally while the main flow continues. This can result in overheating a heat sensitive polymer causing degradation and formation of burnt off-grade material.

SUMMARY OF THE INVENTION

A primary objective of this invention is to provide an apparatus and method for continuous melt filtration of a thermoplastic polymer melt without interruption for filter replacement or cleaning.

Another objective is to provide a method and apparatus for filtering heat-sensitive polymer melt which promotes streamline flow throughout while minimizing dead spot areas for degraded material to accumulate.

These and other objectives are accomplished by providing an apparatus for continuously melt filtering molten polymer comprising:

(A) an arbor seated in a fixed support, the arbor having inlet and outlet ports for respectively receiving contaminated and discharging filtered melt, the ports communicating with openings in a pair of housings rotatably mounted on the arbor;

(B) a plurality of filter pod assemblies outwardly of and mounted on the rotatable housings, each assembly having a filter for contaminated melt and intake and discharge openings intermittently alignable with the ports on rotation of the housings;

(C) means to rotate the housings to position a clean filter in the path of the contaminated melt and to remove the filter from the path when blocked with contaminants;

(D) passages associated with the inlet and outlet ports of the arbor and the housings for gradually establishing a flow of melt into a clean filter as it is rotated into filtering position; and (E) thermally dilatable seal means between the rotatable housings and the arbor to seal the housings and the arbor during filtering of contaminated melt by a filter element of a filter pod assembly and to establish a clearance between the housing and arbor as a result of thermal expansion of the thermally dilatable seal to allow rotary movement of each housing to replace a blocked filter with a clean filter.

The present invention also provides a process for filtering molten polymer melt continuously which comprises continuously forcing molten polymer melt through an arbor seated in a fixed support, the arbor containing ports directing contaminated melt to and returning filtered melt from a first filter of one of a plurality of filter pod assemblies outwardly adjacent and mounted on housings rotatable with respect to the arbor; trapping contaminants in the first filter to remove contaminants from the melt; dilating creating a clearance between the housings and the arbor to permit rotary replacement of the first filter pod assembly blocked with contaminants with a second clean filter of another filter pod assembly, while continuing flow of the melt, bleeding a side stream of contaminated melt into said second clean filter as the second filter pod assembly moves into filtering position, and sealing the housings to the arbor when the second filter pod assembly is in filtering position.

BRIEF DESCRIPTION OF THE DRAWINGS

In describing the overall invention, reference will be made to the accompanying drawings, which illustrate preferred embodiments of the present invention. The drawings are not intended to imply any limitation of the scope of the invention and it is understood that minor variations on the location and detailed design of the features herein described are likewise considered to be within the purview of this invention.

DETAILED DESCRIPTION OF THE INVENTION

Figure 1:
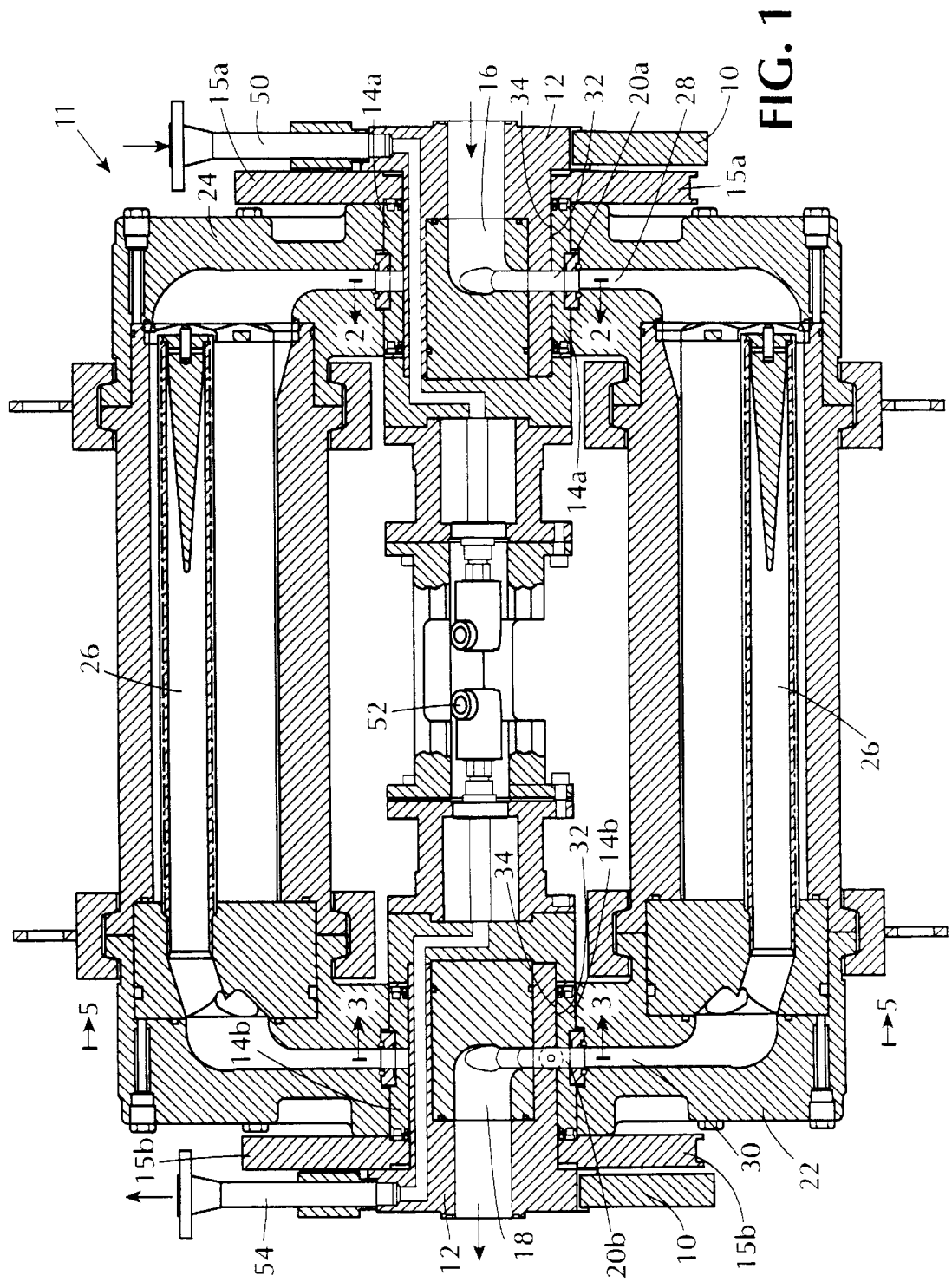
FIG. 1 is a sectional view of the filter apparatus in accordance with the invention.

Referring now to the drawings, FIG. 1 collectively illustrates apparatus as 11 for continuous melt filtering molten polymer. Apparatus 11 comprises elongated arbor 12 seated in a fixed support 10, the arbor 12 having fixed inlet 16 and outlet 18 ports for respectively receiving contaminated and discharging filtered melt, the ports selectively communicating with openings 20a and 20b in a pair of housings 14a and 14b rotatably mounted about arbor 12. Plural (two shown) filter pod assemblies 22 and 24 are outwardly of and mounted at each end on rotatable housings 14a and 14b. Each filter pod assembly contains three filters 26 (only one shown) for contaminated melt. Each pod assembly has intake 28 and discharge 30 openings intermittently alignable with ports 16, 18 on rotation of the housings 14a and 14b in a manner to be further described.

Means including gears 15a and 15b attached to housings 14a and 14b are operatively associated with a conventional drive system, not shown, to position a filter pod assembly having a clean filter in the path of contaminated melt and to remove a filter pod assembly having a blocked filter from the melt pathway. Thermally dilatable seal means between rotating housings 14a and 14b and fixed arbor 12 comprise cooperating sealing surfaces 32 and 34 of the housings and arbor, respectively, more particularly described hereafter.

In the illustrated embodiment, filter 26 is a conventional perforated screen sized to block contaminants in the openings and allow melt polymer to pass through. An alternative and preferred form of filter 26 comprises a perforated hollow cylindrical tube having a plurality of reusable toroidal filter elements removably mounted around the tube, and abuttingly engaged with each other to define radial filtering passages between adjacent filter elements to remove contaminated particles from melt. Such filters are shown in co-pending and co-assigned application Ser. No. 09/190,289 filed Nov. 13, 1998 entitled Filter Element and Use Thereof, by J. C. Hoagland and A. Karagiannnis, the disclosure of which is incorporated by reference herein.

Figure 2:
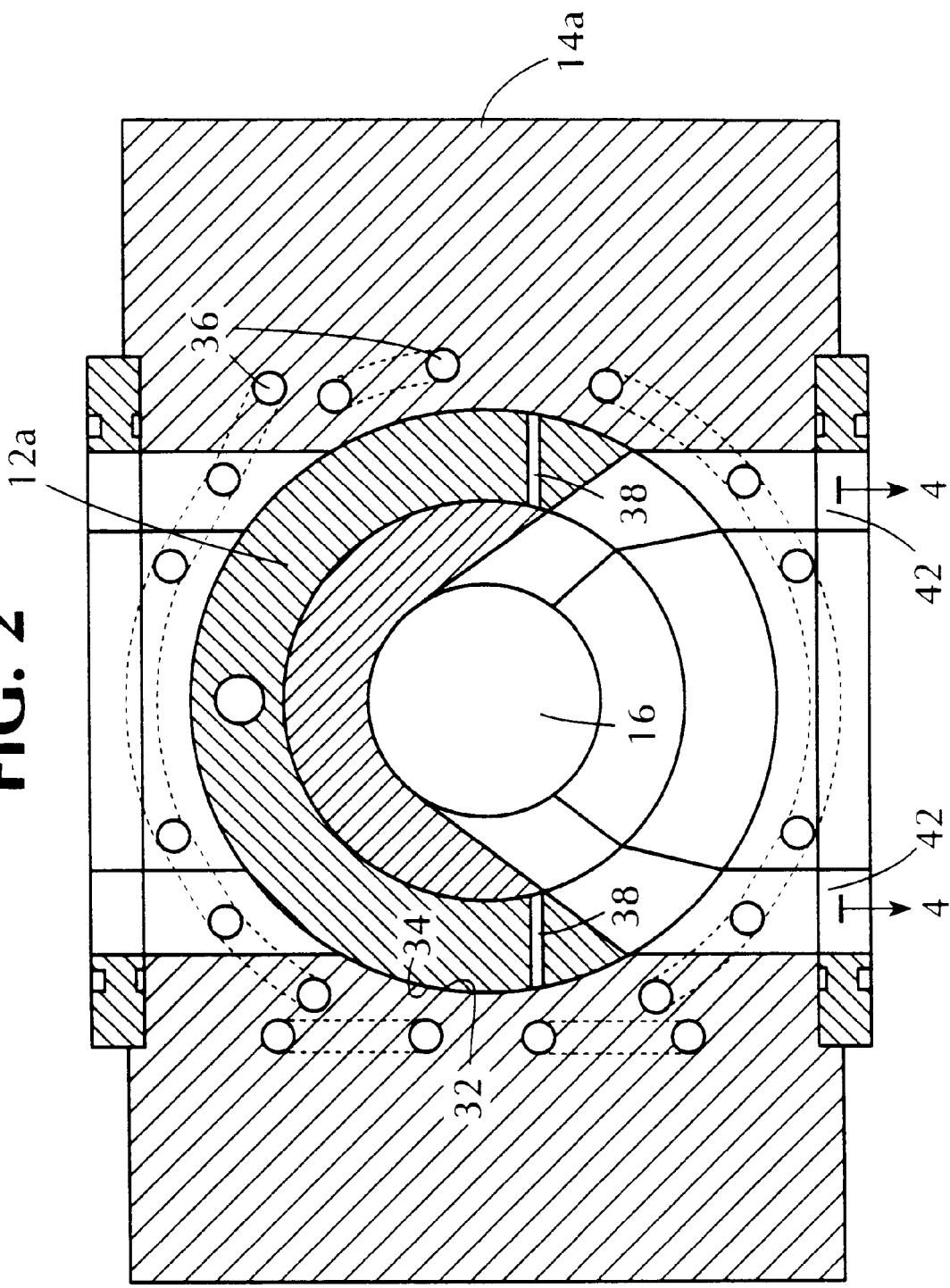
FIG. 2 is a sectional view along line 2—2 of FIG. 1 showing the inlet port and thermally dilatable seal means.
Figure 3:
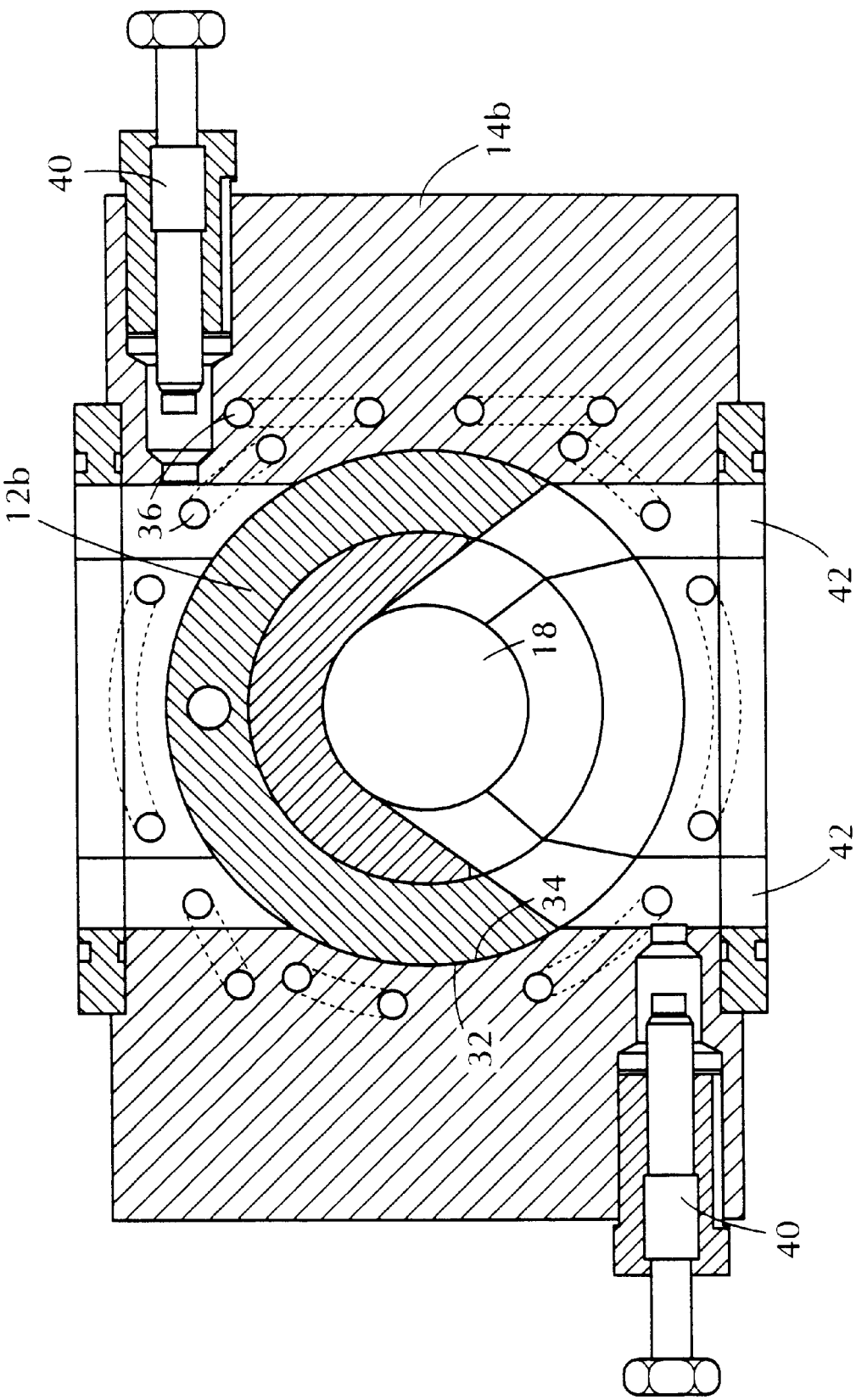
FIG. 3 is a sectional view along 3—3 of FIG. 1 showing the outlet port and the thermally dilatable seal means.

Referring to FIGS. 2 and 3, the thermally dilatable seal means is more particularly described. During filtering operation of the assembly 11, sealing surfaces 32 and 34 are in intimate contact with each other (no clearance) to prevent melt from leaking from the filter assembly. When the filters of a filter pod assembly (three functioning simultaneously in the embodiment shown) are blocked and rotation of the filter pod assembly is necessary to move clean filters into and blocked filters out of position, the thermally dilatable seal expands to create a clearance between the housings and arbor as a result of passing oil at elevated temperature through plural oil passages 36 immediately adjacent sealing surfaces 32 and 34, to facilitate rotation of the housing around the arbor. Passage 36 are shown in FIGS. 2 and 3 in housing 14, similar passages immediately adjacent sealing surface 34 of arbor 12 are provided but are not shown for purposes of simplicity. The temperature of the oil flowing through these circuits (i.e., passages in the housings and arbor) is adjusted to be different to cause the differential thermal expansion. Passages 36 communicate with a conventional source (e.g., a pump and reservoir) of temperature controlled oil (not shown). The temperature of the oil circulating in passages 36 raises the temperature of the metal of the housing surface 32 to cause it to differentially expand with respect to that of the opposite face 34 of the arbor which is at slightly lower temperature, usually about 275° F. (135° C.) to 325° F. (163° C.). The temperature of the oil during turning movement of the filter pod assemblies is usually about 350° F. (176° C.) to about 450° F. (232° C.). The clearance between the seal faces is about 0.001 to about 0.009 inches, preferably about 0.001 to about 0.005 inches, between housing surface 34 and arbor surface 32, which permits the housings 14a and 14b carrying the filter assemblies 22 and 24 to turn freely around arbor 12.

Means to rotate the housings carrying the filter pod assemblies includes conventional gears 15a and 15b fastened to the housings 14a and 14b, respectively, which are conventionally associated with a cooperating gear and motor (not shown). The filter assemblies may be positioned at any angle relative to one another, preferably they are positioned 180° from each other as shown and more preferably they are positioned 90° from each other, when four filter assemblies are present. The filters assemblies are independently selected from the group consisting of screens, washers, and the like.

Once clean filters of a fresh filter pod assembly are rotated into place, the temperature of the hot oil in the plural oil passages is reduced so sealing face 32 of the housing opposite sealing face 34 of the arbor surface shrinks in size to close the tight clearance between the moving and stationary parts of the filter apparatus. The thermally dilatable seal means just described importantly reduces to nearly zero the clearance for melt to leak from the system and it cools the surfaces wetted by the melt sufficiently to reduce melt degradation. This results in a higher quality plastic product by keeping melt from burning which is a critical concern with heat sensitive plastic materials such as polyvinyl butyral.

The cooperating seal surfaces 32 and 34 on the housings and arbor respectively are preferably coated with commercially available hard coat material, such as a tungsten carbide/cobalt coating or equivalent for long seal wear life. For minimum melt leakage the aspect ratio (length to diameter) of the seals is 1.0.

To facilitate interchange of filter pod assemblies without interruption of filterings, plural bleed passages 38 (FIG. 2) communicate with inlet port 16 of arbor 12. Bleed passages 38 gradually allow contaminated melt to bleed slowly into clean filters of a filter pod assembly, as such assembly moves into filtering position via rotation of housings 14a and 14b. As rotation around the arbor of the filter pod assembly with the three clean filters continues, more polymer melt flows into the fresh filters while at the same time flow to the blocked filter is reduced, until it finally stops flowing to the blocked filter when the two filter pod assemblies have interchanged positions. The blocked filter is then cleaned or replaced without any interruption in the filtering process. The axial length of inlet port 16 is about 1 to about 4 inches and the ports are from about 7 to about 12 inches in diameter.

Bleed vent passages 40 (FIG. 3) communicate with outlet port 18 of arbor 12 to selectively bleed air from the molten polymer melt pathway. This feature reduces or eliminates undesirably entrapped air bubbles in the extrudate.

Figure 4:
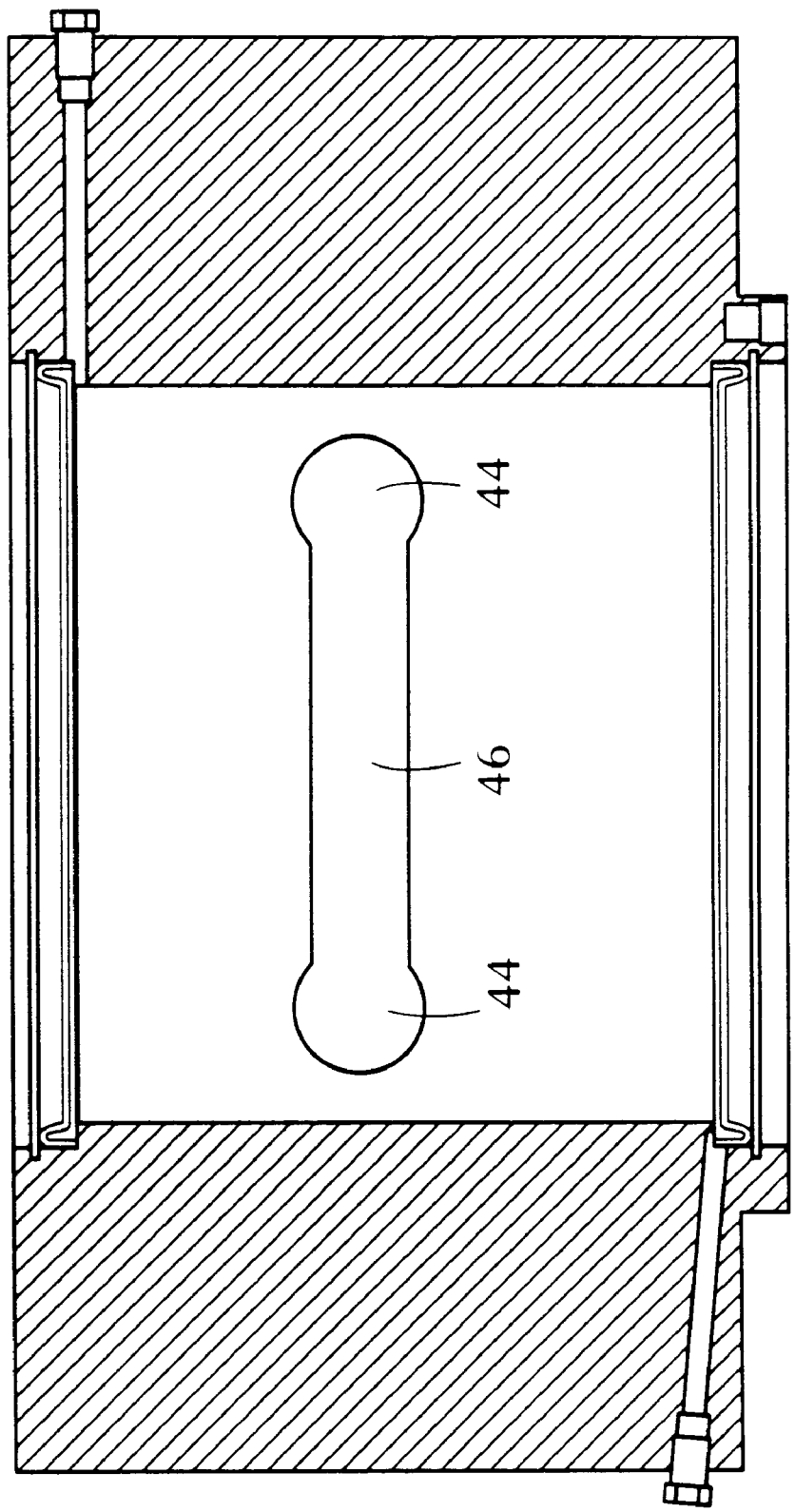
FIG. 4 is a sectional view of a dog bone shaped passage along 4—4 of FIG. 2.
Figure 5:
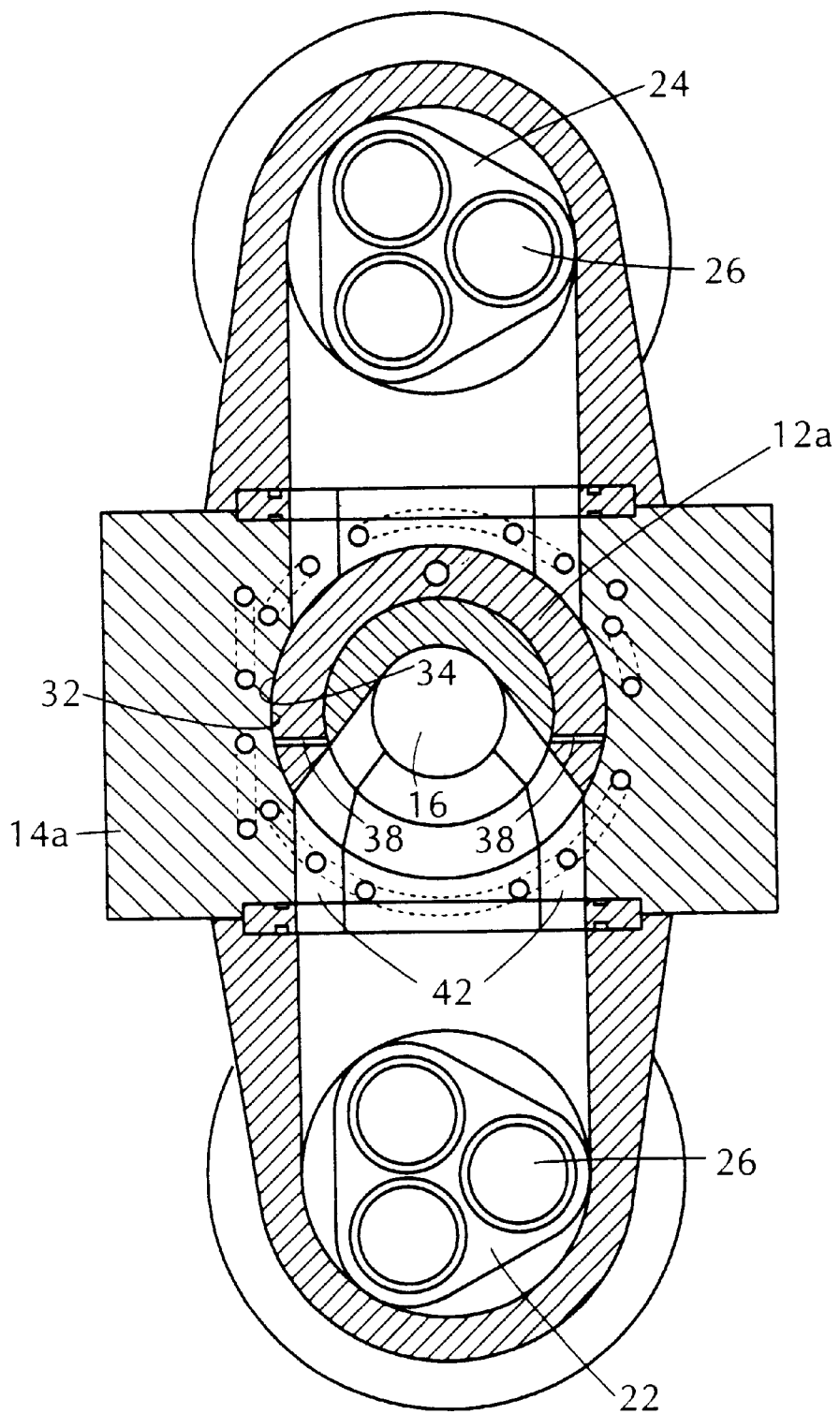
FIG. 5 is a sectional view along 5—5 of FIG. 1 showing the filter pod assemblies in communication with the housing and the arbor.

FIGS. 2 and 3 show the preferable divergent shape of flow passages 42 at both the inlet 16 and outlet 18 ports which are in communication with the openings in the rotatable housings 14a and 14b. The divergent flow passages are preferably dog-bone shaped in cross-section (FIG. 4), i.e., larger at the extreme ends 44 than in the middle 46. This preferred shape induces more rapid melt flow through the diverging outside regions of the dog-bone cross-section, thereby avoiding build up of heat sensitive polymer melt on the walls of the passages. This minimizes melt degradation and improves quality of the filtered product.

Operation of the apparatus shown in the drawings can either be manual or automated. When automated, the system typically has conventional pressure sensor elements (not shown) on the contaminated melt feed line to the system and the filtered melt discharge line from the system to continuously monitor pressure drop. When a preset pressure drop is reached, the sensors electrically activate turning movement of a motor and drive (not shown) operatively associated with gears 15 (FIG. 1). As movement continues, bleed ports 38 will communicate with inlet passage 28 of a clean filter pod assembly being moved into filter position to prefill the assembly with melt to be filtered by the filters of the filter assembly. Simultaneously (via appropriate design of the apparatus) vent port 40 opens to exhaust gas from the clean filter pod assembly. When melt is observed issuing from the melt port (typically after about 45 minutes) the vent port is manually closed via an appropriate valve. Simultaneous with the noted operation/positioning of the vent port, rotary movement continues in order to move the inlet and outlet openings of the clean filter pod assembly into filtering position for the full melt stream. With respect to the thermal seal, when the sensors monitoring pressure detect the preset pressure drop another appropriate signal (initiated either manually or automatically) is transmitted to means (not shown) heating the heat transfer fluid to be circulated through passage 36 adjacent seal surfaces 32 to commence heating the heat transfer fluid. When such fluid reaches preset temperature and sealing surface 32 dilates, the filter pod assemblies 22, 24 and bleed and vent passages 38 and 40 are moved into operating position by the turning movement of housings 14a and 14b with respect to arbor 12. After a clean filter pod assembly is in line, the temperature of the heat transfer fluid is (preferably automatically) reversed to accordingly reverse dilation and cool sealing surface 32, thereby eliminating or minimizing melt leakage and potentially polymer degradation.

During operation of the filter apparatus the viscosity of the melt passing through the filter pod assemblies is controlled using jackets (not shown) of the assemblies through which hot oil is circulated. FIG. 1 shows the upstream inlet channel 50 for the hot oil that circulates to the inlet of rotatory joint 52 which communicates via hoses (not shown) with the filter assembly jackets. The hot oil exits via outlet channel 54 and is then recirculated via inlet channel 50.

In operation the filter apparatus removes gel particles and solid impurities from the polymer melt passing through the filter assembly. Hot molten polymer melt at elevated pressure generated, for example, by conventional upstream extruder (not shown) is forced into arbor 12 through inlet port 16 and housing opening 20a into filters 26 of a filter pod assembly 22 in the on-line filtering position. The pressure at which the melt is forced through the filter apparatus is from about 2000 to about 6000 psi. After passing through filters 26, filtered melt exits through rotatable housing opening 20b to outlet port 18 to be further processed. When filters of filter pod assembly 22 are sufficiently blocked the pod assembly is replaced with a fresh one either manually or automatically in the manner previously described. Importantly, the gradual changeover from used to fresh filters allow melt filtration to continue uninterrupted while producing quality material at the same time.

Other variations and modifications which will be obvious to those skilled in the art can be made in the foregoing examples without departing from the spirit or scope of the invention.

What is claimed is:

1. Apparatus for continuously melt filtering molten polymer comprising:

(A) an arbor seated in a fixed support, said arbor having inlet and outlet ports for respectively receiving contaminated and discharging filtered melt, said ports communicating with openings in a pair of housings rotatably mounted on said arbor;

(B) a plurality of filter pod assemblies outwardly of and mounted on said rotatable housings, each assembly having a filter for contaminated melt and intake and discharge openings intermittently alignable with the ports on rotation of the housings;

(C) means to rotate the housings to position a clean filter in the path of the contaminated melt and to remove said filter from said path when blocked with contaminants;

(D) passages associated with the inlet and outlet ports of the arbor and the housings for gradually establishing a flow of melt into a clean filter as it is rotated into filtering position; and (E) thermally dilatable seal means between the rotatable housings and the arbor to seal the housing and the arbor during filtering of contaminated melt by a filter element of a filter pod assembly and to establish a clearance between each housing and arbor as a result of thermal expansion of the thermally dilatable seal to allow rotary movement of each housing to replace a blocked filter with a clean filter.

2. The apparatus of claim 1, comprising two or more filter pod assemblies outwardly of and mounted on said rotatably housings.

3. The apparatus of claims 1 or 2, wherein said filters employed in said filter pod assemblies are independently selected from the group consisting of screens and plurality of reusable toroidal filter elements removably mounted around a perforated tube.

4. The apparatus of claim 1, wherein said thermally dilatable seal means comprises cooperating sealing surfaces of each of the housings and arbor.

5. The apparatus of claim 4, wherein said thermally dilatable seal means also includes plural passages in each of said housings and said arbor adjacent sealing surfaces of the seal means to facilitate interchange of said filter pod assemblies.

6. The apparatus of claim 1, wherein said ports have an axial length from about 1 inch to about 4 inches.

7. The apparatus of claim 1, wherein said ports are from about 7 inches to about 12 inches diameter.

8. The apparatus of claim 1, wherein said ports have divergent flow passages.

9. The apparatus of claim 8, wherein said divergent flow passages have a dog-bone shaped cross-section.

10. A process for filtering molten polymer melt continuously which comprises continuously forcing molten polymer melt through an arbor seated in a fixed support, said arbor containing ports directing contaminated melt to and returning filtered melt from a first filter of one of a plurality of filter pod assemblies outwardly adjacent and mounted on housings rotatable with respect to the arbor; trapping contaminants in the first filter to remove contaminants from the melt; rotating the one filter pod assembly out of filtering position when the first filter is blocked with contaminants while gradually replacing the first filter with a second clean filter of another filter pod assembly while continuing flow of the melt; bleeding a side stream of contaminated melt into the clean filter as the another filter pod assembly moves into filtering position; sealing the housings to the arbor while the one filter pod assembly is in filtering position and then selectively thermally dilating the seal to create a clearance between the housings and the arbor to permit rotary replacement movement of the another filter pod assembly into filtering position.

11. The process of claim 10, wherein the molten polymer melt is at a pressure from about 2000 to about 6000 psi during passage through said arbor.

12. The process of claim 11, wherein said clearance between said housings and said arbor is about 0.001 to 0.009 inches.

* * * * *

UNITED STATES PATENT AND TRADEMARK OFFICE
CERTIFICATE OF CORRECTION

PATENT NO. : 6,117,338
DATED : September 12, 2000
INVENTOR(S) : John C. Hoagland et al.

It is certified that error appears in the above-identified patent and that said Letters Patent is hereby corrected as shown below:

Column 2,
Line 32, "dilating creating" should read -- creating --.

Column 3,
Line 46, Passage 36" should read -- Passages 36 --; and
Line 64, "filter" should read -- filter pod --.

Column 4,
Line 6, "filters" should read -- filter --; and
Line 53, "build up" should read -- buildup --.

Column 5,
Line 45, "allow" should read -- allows --.

Column 6,
Line 16, "rotatably" should read -- rotatable --; and
Line 20, "plurality" should read -- a plurality --.

Signed and Sealed this

Eighteenth Day of December, 2001

Attest:

JAMES E. ROGAN
Attesting Officer      Director of the United States Patent and Trademark Office